United States Patent [19]

Majima et al.

[11] Patent Number: 5,129,489
[45] Date of Patent: Jul. 14, 1992

[54] HYDRAULICALLY OPERATED DISPLACEMENT TRANSMISSION MECHANISM FOR SHOCK ABSORBER WITH VARIABLE DAMPING FORCE

[75] Inventors: Youzou Majima, Kariya; Yutaka Suzuki, Nishio; Eiju Matsunaga, Kariya; Toshinobu Ishida, Okazaki; Sigeru Kamiya, Aichi; Yasumasa Hagiwara, Okazaki; Masatoshi Kuroyanagi, Kariya, all of Japan

[73] Assignee: Nippondenso Co., Ltd., 1-1, Kariya, Japan

[21] Appl. No.: 424,881

[22] Filed: Oct. 20, 1989

[51] Int. Cl.⁵ ................... F15B 15/00; F16K 31/02
[52] U.S. Cl. ........................ 188/299; 60/545; 60/592; 188/319; 251/57; 251/129.06
[58] Field of Search .......... 60/545, 592; 188/299, 188/319, 322.15; 251/57, 129.06

[56] References Cited

U.S. PATENT DOCUMENTS

| 3,648,967 | 3/1972 | O'Neill et al. | 251/57 |
| 3,920,217 | 11/1975 | Olsen | 251/57 |
| 4,729,459 | 3/1988 | Inagaki et al. | |
| 4,762,300 | 8/1988 | Inagaki et al. | 251/129.06 |

FOREIGN PATENT DOCUMENTS 60-143237 7/1985 Japan .
60-143238 7/1985 Japan .
61-67009 5/1986 Japan .

Primary Examiner—Gerald A. Michalsky

[57] ABSTRACT

A variable-damping-force shock absorber includes a piezoelectric actuator for producing a displacement, a hydraulic pressure chamber filled with a working oil and having a volume variable in response to the displacement produced by said piezoelectric actuator, and a plunger slidably disposed in a sleeve and reciprocally movable in response to a change in the volume of said hydraulic pressure chamber. The sleeve and said plunger define therebetween a gap communicating with said hydraulic pressure chamber. A supply passage for supplying a working oil from an external working oil source into said hydraulic pressure chamber extends through the gap. A leakage of the working oil from the hydraulic pressure chamber through the gap can automatically be compensated for by working oil supplied through the supply passage. Since the working oil leaks from and is supplied into the hydraulic pressure chamber through the gap, the leakage and supply of the working oil are kept in equilibrium.

13 Claims, 14 Drawing Sheets

HYDRAULICALLY OPERATED DISPLACEMENT TRANSMISSION MECHANISM FOR SHOCK ABSORBER WITH VARIABLE DAMPING FORCE

BACKGROUND OF THE INVENTION

1. Field of the Invention

The present invention relates to a shock absorber capable of producing a variable damping force, for use between a vehicle body and a road wheel of a motor vehicle, and more particularly a hydraulically operated displacement transmission mechanism in such a shock absorber which has a means for automatically compensating for a leakage of working oil from a hydraulic pressure chamber which is compressible by a piezoelectric actuator in the form of a stack of piezoelectric elements.

2. Prior Art

As is well known in the art, some automobiles are equipped with adjustable shock absorbers which can vary or adjust damping forces depending on vibrating or running conditions of the automobiles to give better riding comfort to automobile drivers and passengers. Such adjustable shock absorbers are disclosed in Japanese Laid-Open Patent Publications Nos. 60(1985)-143237, 60(1985)-143238, and Japanese Laid-Open Utility Model Publication No. 61(1986) -67009, for example. Some adjustable shock absorbers incorporate a piezoelectric actuator composed of a stack of piezoelectric elements (also referred to as a "piezoelectric stack") for actuating a damping force varying valve for an increased response to an input signal, as disclosed in Japanese Laid-Open Patent Publication No. 61(1986)-85210 and U.S. Pat. No. 4,729,459, for example.

The piezoelectric stack itself does not produce a sufficient displacement when a voltage is applied thereto, and hence is not used directly as a damping force varying valve. Instead, the displacement of the piezoelectric stack is amplified by working oil and applied to a plunger.

More specifically, the piezoelectric actuator comprises a housing defining a cylindrical storage chamber filled with working oil, and a piezoelectric stack disposed in the storage chamber and having one end fixed to the housing. A piston is fitted over the opposite free end of the piezoelectric stack and slidably disposed in the storage chamber. The piston and the housing define therebetween a hydraulic pressure chamber into which one end of a plunger faces. The plunger is axially slidably fitted in a sleeve. When a voltage is applied to the piezoelectric stack, the piston is moved to cause working oil in the hydraulic pressure chamber to move the plunger axially for thereby varying damping forces of the shock absorber. The piston and the plunger can be returned to their original positions by respective springs.

Since the diameter of the plunger is much smaller than the diameter of the piston, the displacement of the piezoelectric stack is amplified by the working oil in the hydraulic pressure chamber and applied to the plunger.

However, it has been difficult to seal the hydraulic pressure chamber completely. Even if an O-ring is placed around the plunger, the working oil in the hydraulic pressure chamber gradually leaks out along the peripheral surface of the plunger during repeated axial movement of the plunger. Therefore, the hydraulic pressure chamber becomes negative in pressure, and the plunger is displaced gradually decreasing strokes while the voltage applied to the piezoelectric stack has constant peak values. When this happens, the damping forces cannot sufficiently be varied or switched over.

Even if the hydraulic pressure chamber is completely sealed off against working oil leakage, another problem occurs. When the ambient temperature rises, the working oil in the hydraulic pressure chamber expands and the plunger is undesirably displaced by the expanding working oil. Therefore, the damping forces of the shock absorber may be varied when they should not be varied.

SUMMARY OF THE INVENTION

It is an object of the present invention to provide a hydraulically operated displacement transmission mechanism for use in a shock absorber capable of varying or adjusting damping forces, the displacement transmission mechanism having a means for automatically making up for a leakage of working oil from a hydraulic pressure chamber thereby to transmit the displacement of a piezoelectric stack reliably to a plunger for varying or switching over the damping forces.

According to the present invention, there is provided a hydraulically operated displacement transmission mechanism comprising an actuator for producing a displacement, a hydraulic pressure chamber filled with a working fluid and having a volume variable in response to the displacement produced by the actuator, a sleeve, a plunger slidably disposed in the sleeve and reciprocally movable in response to a change in the volume of the hydraulic pressure chamber, the sleeve and the plunger defining therebetween a gap communicating with the hydraulic pressure chamber, and a supply passage for supplying a working fluid from an external working fluid source into the hydraulic pressure chamber, the supply passage extending through the gap.

The plunger may have an annular groove defined therein and positioned so that it is aligned with the supply passage when the plunger returns to a position in which the volume of the hydraulic pressure chamber is maximum.

The hydraulically operated displacement transmission mechanism is incorporated in a shock absorber and further includes a valve coupled to the plunger for varying damping forces of the shock absorber.

The plunger may be in the form of a rod axially slidably fitted in the sleeve, or may comprise a rod axially slidably fitted in the sleeve, a disc joined to one end of the rod and disposed in the hydraulic pressure chamber, and either an O-ring disposed between the disc and the sleeve around the gap, or a sealing resilient layer attached to the disc and disposed around the one end of the rod.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
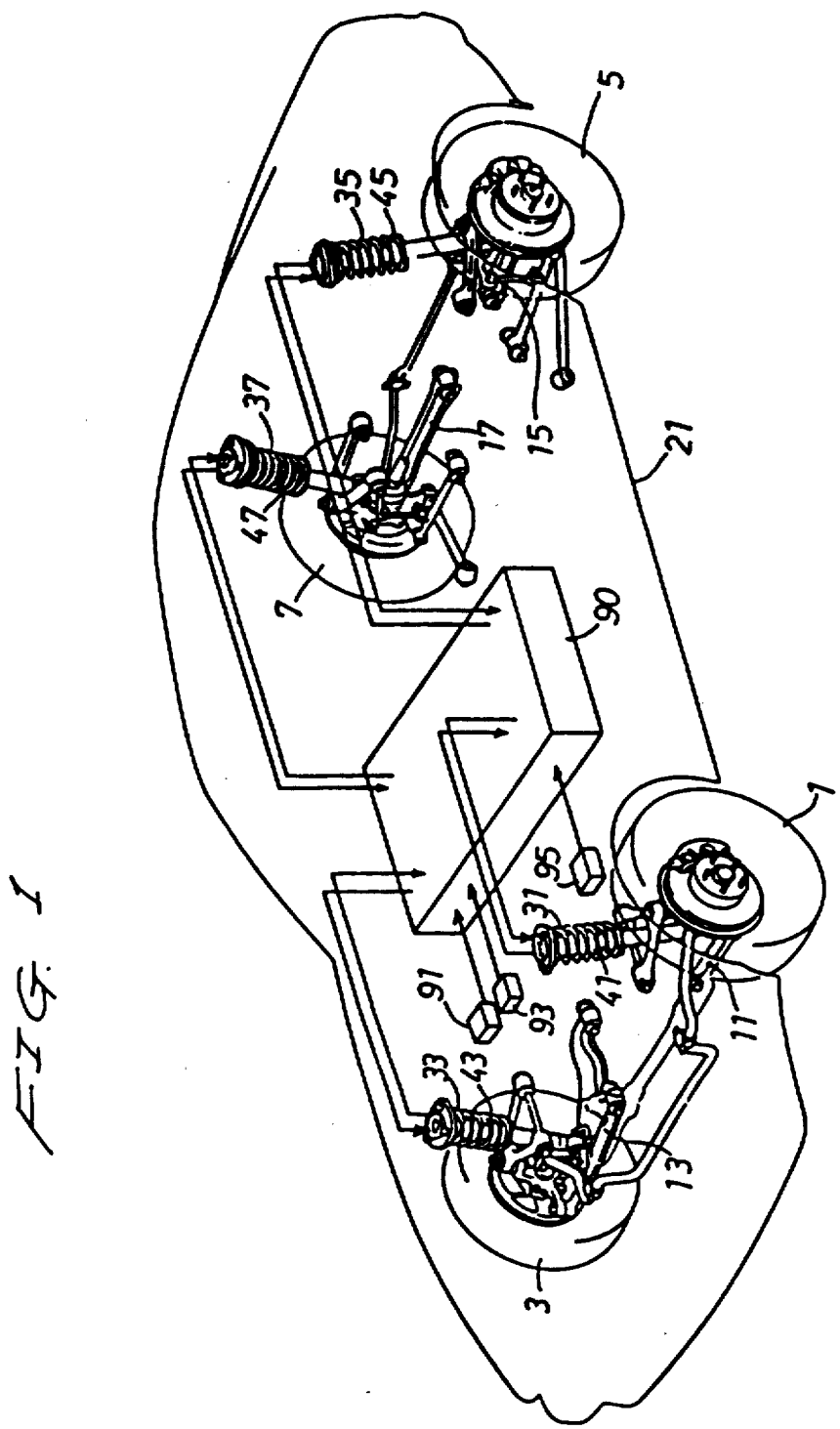
FIG. 1 is a perspective view of a damping force control system on an automobile which includes variable-damping-force shock absorbers each incorporating a hydraulically operated displacement transmission mechanism according to the present invention.

Like or corresponding parts are denoted by like or corresponding reference numerals throughout views.

FIG. 1 shows a shock absorber damping force control system incorporated in a motor vehicle such as an automobile. The shock absorber damping force control system includes four suspensions connected between suspension arms 11, 13, 15, 17 of road wheels 1, 3, 5, 7 and a vehicle body 21. The suspensions comprise four coil springs 31, 33, 35, 37 and four variable-damping-force shock absorbers 41, 43, 45, 47 around which the coil springs 31, 33, 35, 37 are disposed. Each of the shock absorbers 31, 33, 35, 37 incorporates therein a hydraulically operated displacement transmission mechanism according to the present invention.

The shock absorbers 41, 43, 45, 47 are constructed such that their damping forces are variable under certain conditions.

The construction of the shock absorbers 41, 43, 45, 47 will be described below. Since the shock absorbers 41, 43, 45, 47 are structurally identical to each other, only one of them, the shock absorber 41 associated with the front left road wheel 1, for example, will be described below.

Figure 2:
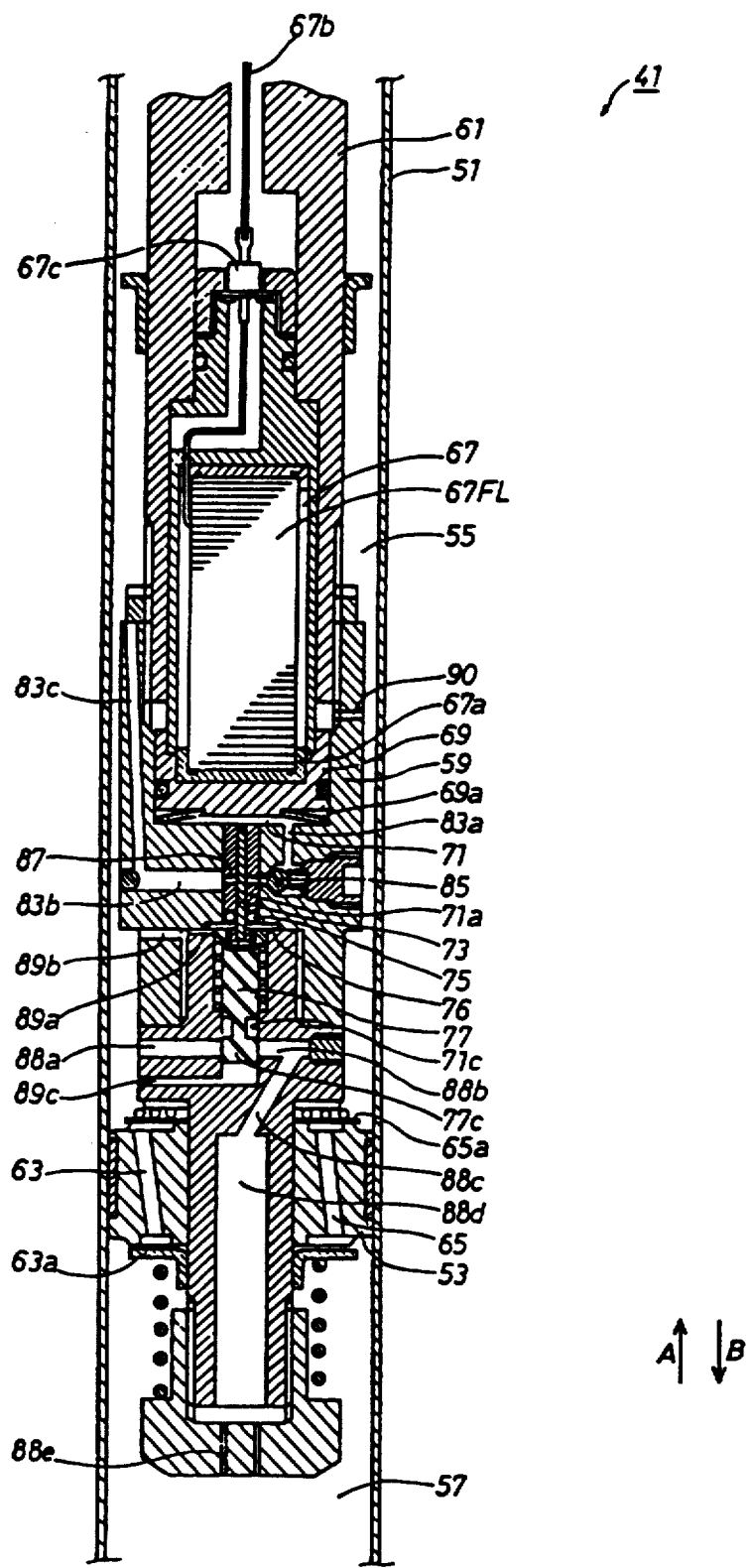
FIG. 2 is a fragmentary cross-sectional view of a variable-damping-force shock absorber incorporating a hydraulically operated displacement transmission mechanism according to a first embodiment of the present invention.

As shown in FIG. 2, the shock absorber 41 comprises a cylinder 51 and a main piston 53 slidably fitted therein for movement in axial directions indicated by the arrows A, B. The interior space of the cylinder 51 is divided into first and second hydraulic pressure chambers 55, 57 by the main piston 53. The main piston 53 is coupled to one end of a piston rod 59, the other end of which is connected to a shaft 61. The cylinder 51 has a lower end (not shown) connected to the suspension arm 11 which supports the front left road wheel 1. The shaft 61 has an upper end (not shown) coupled to the motor vehicle body 21.

The main piston 53 has an expansion-side fixed orifice 63 and a contraction-side fixed orifice 65 through both of which the first and second hydraulic pressure chambers 55, 57 are held in fluid communication with each other. Plate valves 63a, 65a are mounted respectively on the opposite ends of the main piston 53 over the outlet ends of the fixed orifices 63, 65. The plate valves 63a, 65a serve to allow working oil to flow through the fixed orifices 63, 65 in only one direction therethrough.

When the main piston 53 slides in the cylinder 51 in the axial directions indicated by the arrows A, B, working oil flows through the fixed orifices 63, 65 between the first and second hydraulic pressure chambers 55, 57. Since the working oil flows at a low rate through a relatively small cross-sectional area of the orifices 63, 65, the shock absorber 41 produces a large damping force, giving the suspension a hard setting.

The piston rod 59 and the shaft 61 have an axial hollow storage chamber defined therein that houses a piezoelectric actuator or stack 67FL in the form of a stack of piezoelectric elements made of a piezoelectric ceramic material such as PZT or the like. A piston 69 is disposed in closely confronting relation to the lower end of the piezoelectric stack 67FL with a seat 67a interposed therebetween. The piston 69 is axially slidable in the storage chamber 67, and is normally urged to move in the direction indicated by the arrow A by means of a leaf spring 69a acting on the lower end of the piston 69.

When a voltage which is as high as several hundred volts is applied to the piezoelectric stack 67FL to expand the piezoelectric stack 67FL, the piston 69 is moved several tens $\mu$m in the direction indicated by the arrow B. When the electric charges which have been stored in the piezoelectric stack 67FL by the application of a voltage thereto are discharged, the piston 69 springs back in the direction indicated by the arrow A under the bias of the leaf spring 69a. The piezoelectric stack 67FL is charged and discharged through leads 67b extending through a passage that is defined axially in the shaft 61 and terminals 67c connected to the piezoelectric stack 67FL.

Figure 3:
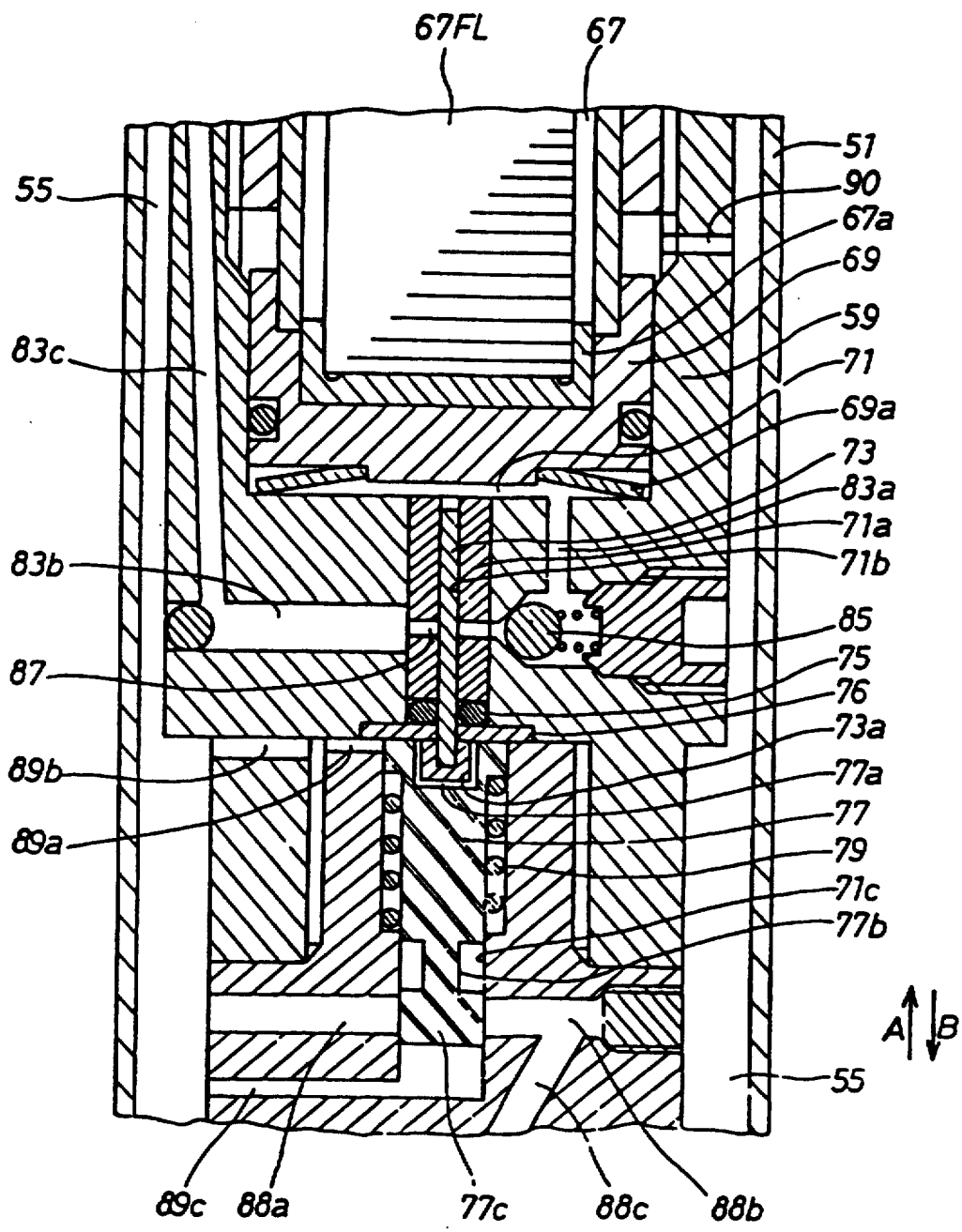
FIGS. 3 and 4 are enlarged fragmentary cross-sectional views of the hydraulically operated displacement transmission mechanism, showing the manner in which it operates.

As illustrated in FIG. 3, the bottom surface of the piston rod 59 which defines the storage chamber 67 and the lower surface of the piston 69 jointly define a hydraulic pressure chamber 71. A sleeve 71a is disposed vertically in the bottom of the hydraulic pressure chamber 71. The sleeve 71a has a central hole 71b extending in the axial direction of the piston rod 59, and a plunger 73 in the form of a rod is slidably fitted in the hole 71b. The plunger 73 has a lower end extending through an O-ring 75 which is positioned beneath the lower end of the sleeve 71a. The O-ring 75 is closely held against the lower end of the sleeve 71a and the plunger 73 by a closure plate 76 that is mounted on a lower surface of the piston rod 59. The lower end of the plunger 73 also extends through the center of the closure plate 76.

An upwardly open cap 73a which is larger in diameter than the hole 71b is fitted over the lower end of the plunger 73 which projects downwardly from the closure plate 76. The cap 73a is loosely disposed in an upwardly opening recess 77a defined in the upper end of a spool valve 77.

The bottom of the hydraulic pressure chamber 71 has a working oil supply passage 83a defined therein and having an upper end opening into the hydraulic pressure chamber 71. The lower end of the working oil supply passage 83a communicates with a series of working oil supply passages 83b, 83c through a check valve 85 and a communication hole 87 defined in the sleeve 71a. The working oil supply passages 83b, 83c are defined in the piston rod 59. The working oil supply passage 83c is connected to an external working oil supply. The check valve 85 is disposed in the piston rod 59 and allows working oil to flow therethrough only when it is supplied into the hydraulic pressure chamber 71. The communication hole 87 is smaller in diameter than the plunger 73 and extends through and across the hole 71b. Therefore, the communication hole 87 is closed by the plunger 73 at all times. However, since there is a gap or clearance between the plunger 73 and the peripheral surface of the hole 71b and working oil is caused to leak through the gap under the pressure of the working oil, an amount of oil depending on the size of the gap is allowed to flow through the communication passage 87 across the plunger 73.

The spool valve 77 is slidably fitted in a hole 71c of a circular cross section defined in the piston rod 59. The hole 71c communicates coaxially with the hole 71b in the plunger 73, and is larger in diameter than the hole 71b. The spool valve 77 is normally urged by a spring 79 in the hole 71c to move in the direction indicated by the arrow A. The spool valve 77 has an annular groove 77b defined in a lower outer peripheral surface thereof. The hole 71c extends through and across two horizontally aligned auxiliary passages 88a, 88b defined in the piston rod 59 and communicating with other auxiliary passages 88c, 88d defined in the piston rod 59 (see also FIG. 4). The auxiliary passage 88d communicates with the second hydraulic pressure chamber 57 through an orifice 88e. The first and second hydraulic pressure chambers 55, 57 are connected to each other through these auxiliary passages 88a, 88b, 88c, 88d.

When the spool valve 77 is at the upper end of its upward stroke indicated by the arrow A under the bias of the spring 79, the auxiliary passages 88a, 88b are held out of communication with each other by a lower cylindrical end 77c of the spool valve 77.

Figure 4:
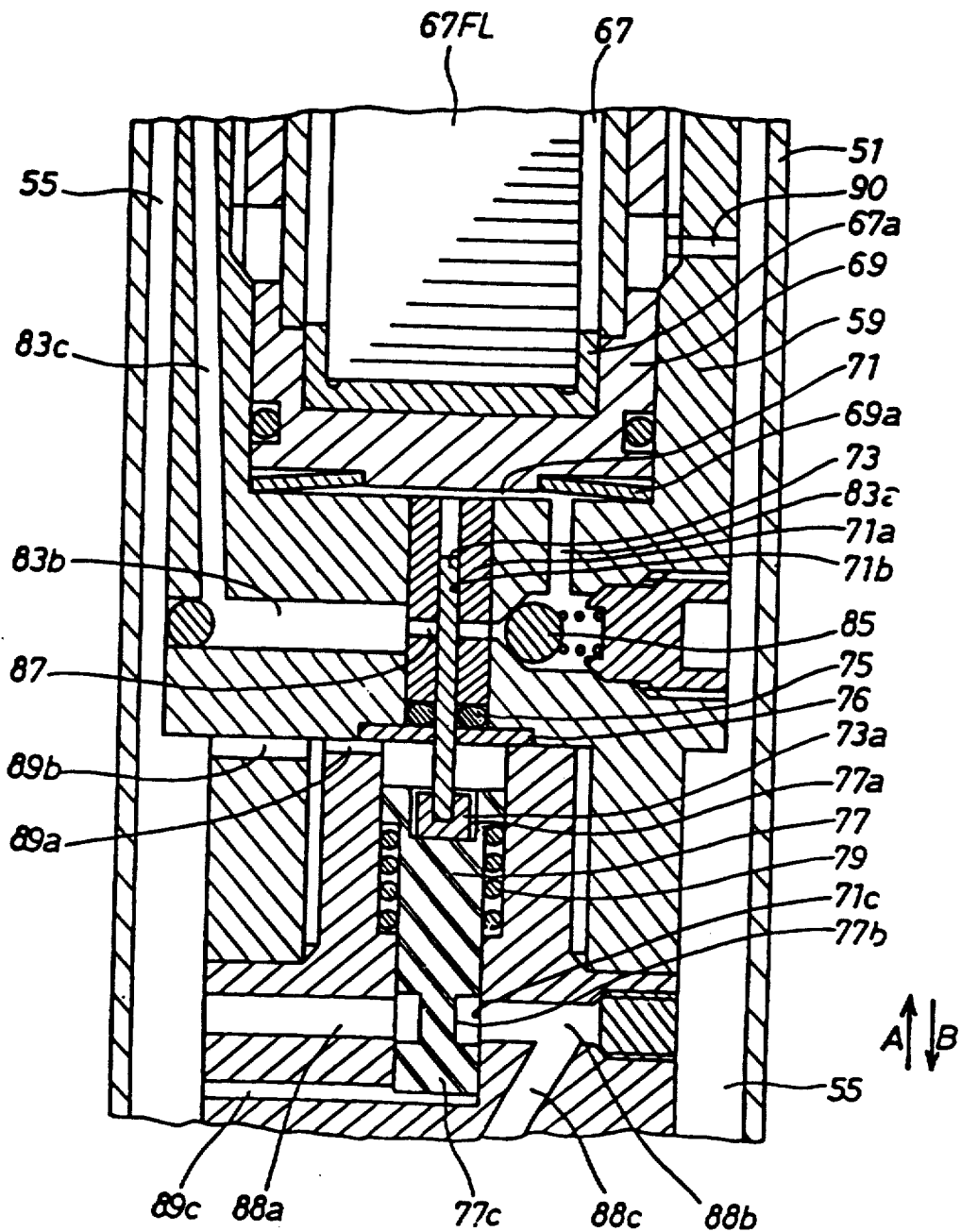

When a voltage is applied to the terminals 67c, the piezoelectric stack 67FL is slightly expanded in the axial direction to move the piston 69 downwardly in the direction indicated by the arrow B, developing a pressure buildup in the hydraulic pressure chamber 71. The plunger 73 is thus moved downwardly in the direction indicated by the arrow B by a distance commensurate with the slight expansion of the piezoelectric stack 67FL and amplified depending on the ratio of the pressure-bearing area of the piston 69 to the pressure-bearing area of the plunger 73. The spool valve 77 is pushed to descend by the same distance until the annular groove 77b thereof is positioned horizontally between the auxiliary passages 88a, 88b, which are thus brought into communication with each other by the annular groove 77b, as shown in FIG. 4.

Inasmuch as the first and second hydraulic pressure chambers 55, 57 now communicate with each other through the auxiliary passages 88a, 88b, 88c, 88d, the working oil flows area which is now provided by the auxiliary passages 88a, 88b, 88c, 88d as well as the orifices 63, 65. At this time, the flow of the working oil is subjected to a lowered resistance, and the working oil flows at an increased rate. Therefore, the shock absorber 41 produces a small damping force, giving the suspension a soft setting.

When the pressure of the working oil in the hydraulic pressure chamber 71 is increased for downward movement of the spool valve 77, the working oil tends to leak from the hydraulic pressure chamber 71 through the gap between the plunger 73 and the sleeve 71a. The rate at which the working oil leaks depends on the size of the gap between the plunger 73 and the sleeve 71a.

To move the spool valve 77 upwardly, the pressure of the working oil in the hydraulic pressure chamber 71 is rendered negative. The plunger 73 also returns upwardly under the negative pressure in the hydraulic pressure chamber 71 and the bias of the spring 79. At the same time, the check valve 85 is opened under the negative pressure in the hydraulic pressure chamber 71, drawing working oil from the external working oil supply through the working oil supply passages 83c, 83b, 83a.

At this time, the working oil flows from the working oil supply passage 83b into the check valve 85 and the working oil supply passage 83a through the communication hole 87 defined in the sleeve 71a, while at the same time the working oil is being restricted by the gap between the plunger 73 and the sleeve 71a. Therefore, the rate at which the working oil flows through the communication hole 87 depends on the size of the gap between the plunger 73 and the sleeve 71a.

Since the working oil is supplied into and leaks from the hydraulic pressure chamber 71 through the gap between the plunger 73 and the sleeve 71a, the rate at which the working oil is supplied into the hydraulic pressure chamber 71 and the rate at which the working oil leaks from the hydraulic pressure chamber 71 are determined by the size of the gap between the plunger 73 and the sleeve 71a. By selecting the gap and the diameter of the communication hole 87 to be of appropriate dimensions, the working oil is supplied into and leaks from the hydraulic pressure chamber 71 at balanced rates, and the amount of working oil in the hydraulic pressure chamber 71 is kept at a constant level or in equilibrium. While the piezoelectric stack 67FL is being repeatedly expanded and contracted, the plunger 73 reciprocates between normal upper and lower stroke ends, i.e., the top and bottom dead centers, so that the shock absorber 41 can vary or switch over its damping forces accurately in response to a damping force switchover drive signal applied to the piezoelectric stack 67FL.

Figure 5:
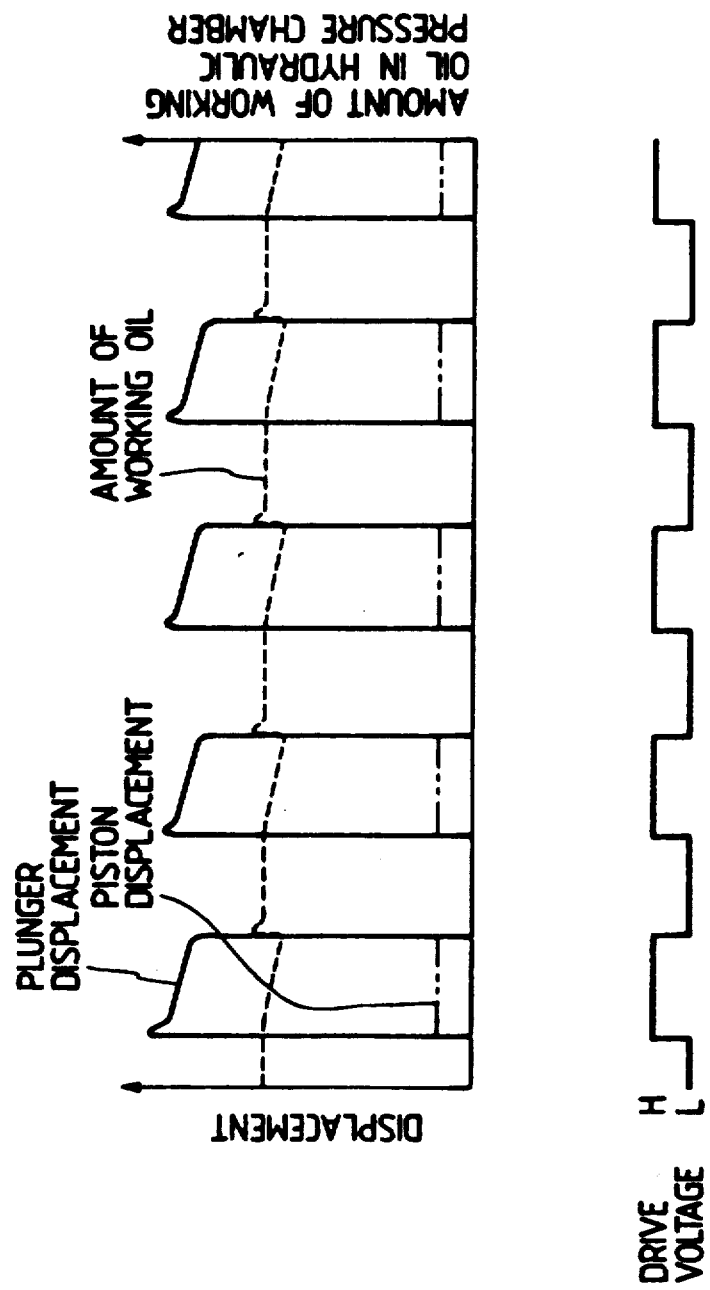
FIG. 5 is a diagram showing how a drive signal, piston and plunger displacements, and an amount of working oil vary with respect to time.

More specifically, as shown in FIG. 5, while the applied drive signal is of a high level, the plunger 73 is gradually retracted upwardly owing to a leakage of the working oil through the gap between the plunger 73 and the sleeve 71a. When the drive signal goes low, however, the amount of working oil in the hydraulic pressure chamber 71 increases up to the original level. Therefore, when the drive signal is of a high level again, the plunger 73 is displaced in the same pattern as before.

The space in the hole 71c above the upper end surface of the spool valve 77 opens into the first hydraulic pressure chamber 55 through communication passages 89a, 89b defined in the piston rod 59, whereas the space in the hole 71c below the lower end surface of the spool valve 77 opens also into the first hydraulic pressure chamber 55 through a communication passage 89c. Therefore, the same hydraulic pressure always acts on the upper and lower end surfaces of the spool valve 77. Even when the pressure of the working oil in the auxiliary passages 88a, 88b, 88c, 88d fluctuates, the spool valve 77 is not affected by such pressure fluctuations, but is reliably moved by the plunger 73.

A communication passage 90 is radially defined in the piston rod 59 and communicates between the storage chamber 67 and the first hydraulic pressure chamber 55 to equalize the pressures in the storage chamber 67 and the first hydraulic pressure chamber 55. Therefore, the pressure applied to the plunger 73 from the storage chamber 67 through the piston 69 and the hydraulic pressure chamber 71, and the pressure applied to the plunger 73 through the communication passage 89c through the spool valve 77 are equalized to each other, so that any abnormal movement of the plunger 73 which would otherwise be caused by the difference between these pressures is prevented from taking place.

A hydraulically operated displacement transmission mechanism according to a second embodiment of the present invention will now be described with reference to FIGS. 6 through 8.

Figure 6:
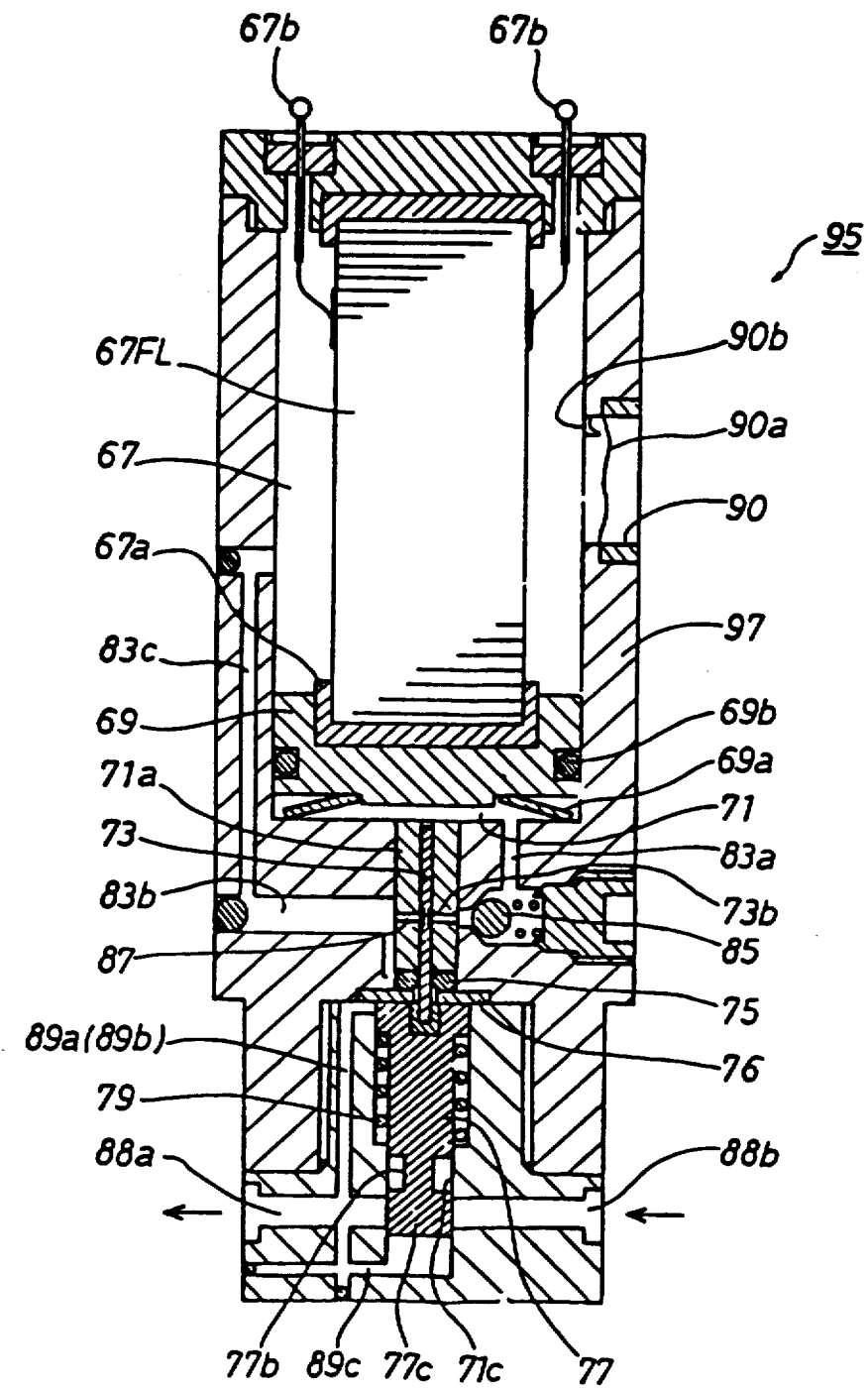
FIG. 6 is a cross-sectional view of a hydraulically operated displacement transmission mechanism according to a second embodiment of the present invention.

FIG. 6 shows a damping force varying valve 95 in the displacement transmission mechanism according to the second embodiment. The damping force varying valve 95 has a housing 97 which accommodates therein the piezoelectric stack 67FL, the hydraulic pressure chamber 71, the plunger 73, the spool valve 77, and other components which are the same as those of the first embodiment. In response to a drive signal applied from the terminals 67b, the piezoelectric stack 67FL enables the spool valve 77 to selectively open and close the auxiliary passages 88a, 88b. The damping force varying valve 95 is basically the same as the corresponding valve in the shock absorber of the first embodiment. Those parts of the valve 95 which are identical to those of the first embodiment are designated by the identical reference numerals, and will not be described in detail.

The damping force varying valve 95 differs from the corresponding valve of the first embodiment in that the plunger 73 has an annular groove 73b (see FIG. 7) defined in a peripheral surface thereof, and the communication passage 90 is closed by a rubber diaphragm 90a.

Figure 7:
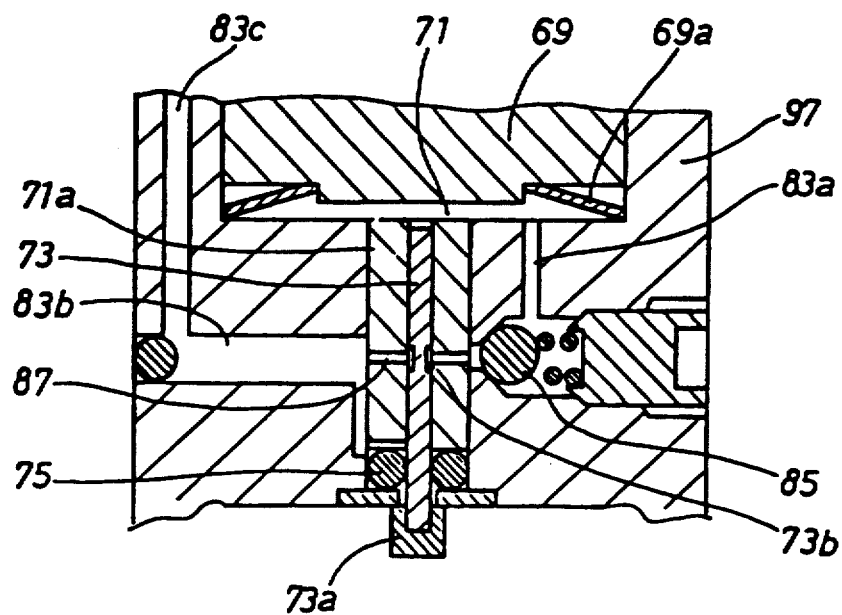
FIGS. 7 and 8 are enlarged fragmentary cross-sectional views showing the manner in which the hydraulically operated displacement transmission mechanism shown in FIG. 6 operates.
Figure 8:
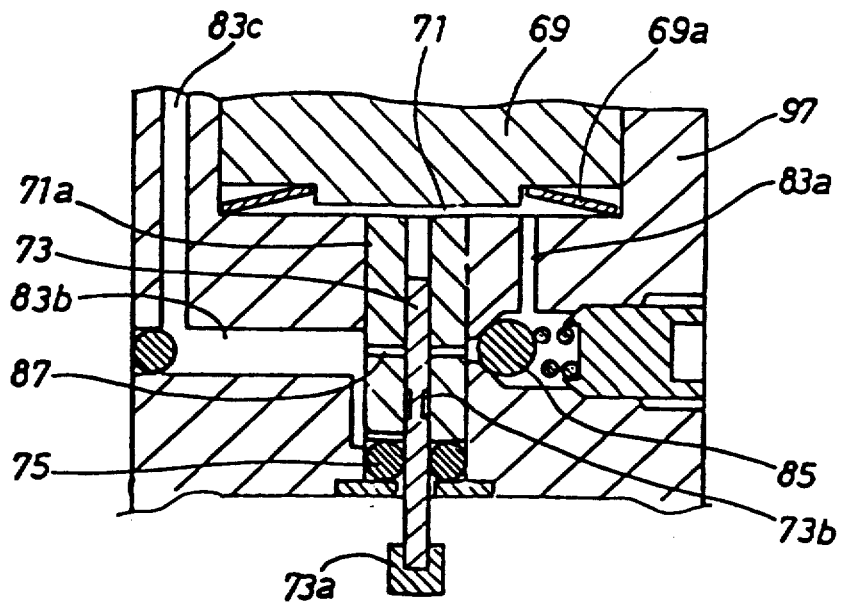

More specifically, the annular groove 73b is positioned such that it will communicate with the communication hole 87 defined in the sleeve 71a when the plunger 73 returns to its original position (FIGS. 6 and 7). When the plunger 73 is lowered under a pressure buildup in the hydraulic pressure chamber 71 with the annular groove 73b out of communication with the communication hole 87, as shown in FIG. 8, the working oil leaks from the hydraulic pressure chamber 71 through the gap between the plunger 73 and the sleeve 71a. When the plunger 73 returns to the original position (FIG. 7), the annular groove 73b communicates with the communication hole 87. Therefore, the resistance to which the working oil from the passage 83b has been subjected is abruptly lowered, allowing the working oil to flow in an amount large enough to compensate for any shortage of working oil in the hydraulic pressure chamber 71. While the plunger 73 is returning to its original position, since the annular groove 73b is not yet positioned in communication with the communication hole 87, no excessive working oil is supplied into the hydraulic pressure chamber 71. With the annular groove 73b provided, the amount of working oil to be supplied can be adjusted without requiring a high degree of accuracy, and the highly accurate damping force varying valve 95 can easily be manufactured.

The rubber diaphragm 90a prevents the working oil filled in the storage chamber 67 from leaking out due to vibrations or different postures when the valve 95, which is constructed as a unit, is assembled into the shock absorber 41 or shipped, or due to expansion of the working oil when the surrounding temperature rises. Since the rubber diaphragm 90a is flexible, it can be displaced to accommodate a change in the amount of the working oil in the storage chamber 67 without affecting the pressure of the working oil. After the valve 95 has been assembled in the shock absorber 41, the amount of the working oil in the storage chamber 67 may vary to a large extent over a long period of time. Particularly, the amount of the working oil in the storage chamber 67 is apt to decrease when it leaks from an O-ring 69b around the piston 69 or the O-ring 75 around the plunger 73. According to the second embodiment, a rupture pin 90b is mounted in the communication passage 90 inside of the rubber diaphragm 90a and directed toward the rubber diaphragm 90a. When the amount of the working oil in the storage chamber 67 is reduced, the rubber diaphragm 90a is gradually displaced inwardly toward the storage chamber 67. When the rubber diaphragm 90a contacts the rupture pin 90b, the rubber diaphragm 90a is ruptured by the rupture pin 90b, bringing the storage chamber 67 and the first hydraulic chamber 55 (FIG. 2) into communication with each other. Consequently, any pressure difference caused by the rubber diaphragm 90a between the storage chamber 67 and the first hydraulic pressure chamber 55 can be eliminated before the pressure difference becomes too large.

Figure 9:
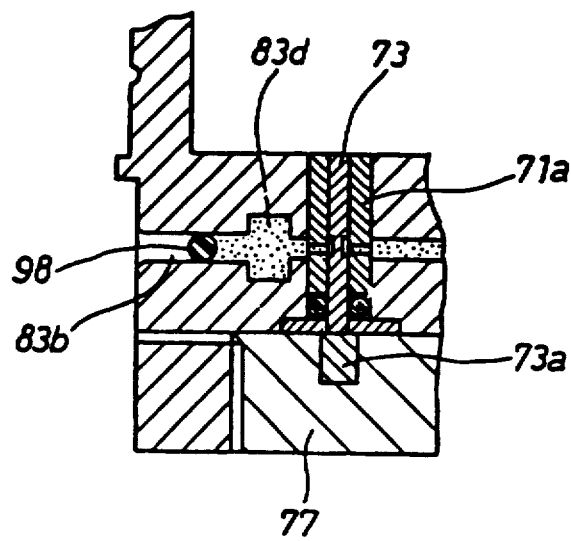
FIGS. 9 and 10 are fragmentary cross-sectional views illustrating different seal structures for working oil supply passages.

FIG. 9 shows a seal structure for the working oil supply passage 83b in the damping force varying valve which is unitized. The working oil supply passage 83b has a larger-diameter portion 83d, and an inlet port of the working oil supply passage 83b is closed by a flexible spherical plug 98 made of rubber or resin.

Figure 10:
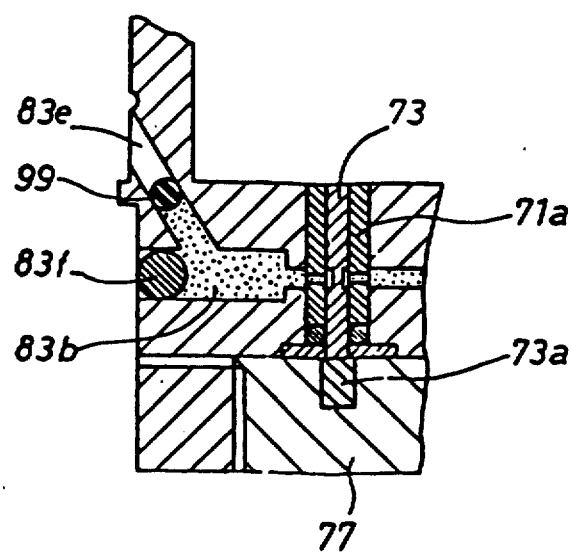

FIG. 10 illustrates another seal structure for the working oil supply passage 98b in the unitized damping force varying valve. The working oil supply passage 83b has a smaller-diameter branch passage 83e which has its inlet port closed by a flexible spherical plug 99 made of rubber or resin. The inlet port of the working oil supply passage 83b itself is closed by a steel ball 83f which is firmly fitted therein.

When the unitized damping force varying valve is assembled into the shock absorber, the working oil is prevented from leaking out of the working oil supply passage 83b by the plug 98 or 99. When the working oil in the unitized valve is reduced after the valve has been incorporated in the shock absorber, the flexible spherical plug 98 or 99 is moved toward the larger-diameter portion 83d or the working oil supply passage 83b until finally the plug 98 or 99 enters the larger-diameter portion 83d or the working oil supply passage 83b which is larger in diameter than the plug 98 or 99. At this time, the working oil supply passage 83b communicates with the external working oil supply. In this manner, the interior space of the unitized valve and the external working oil supply are automatically brought into communication with each other. The steel ball 83f is not moved under the pressure difference thereacross because it is securely fitted in the working oil supply passage 83b. The branch passage 83e shown in FIG. 10 is directed obliquely upwardly when the unitized valve is assembled in the shock absorber 41 and the shock absorber 41 is connected to the vehicle body 21 (FIG. 1). Therefore, air bubbles are prevented from entering the working oil supply passage 83b through the branch passage 83e.

Figure 11:
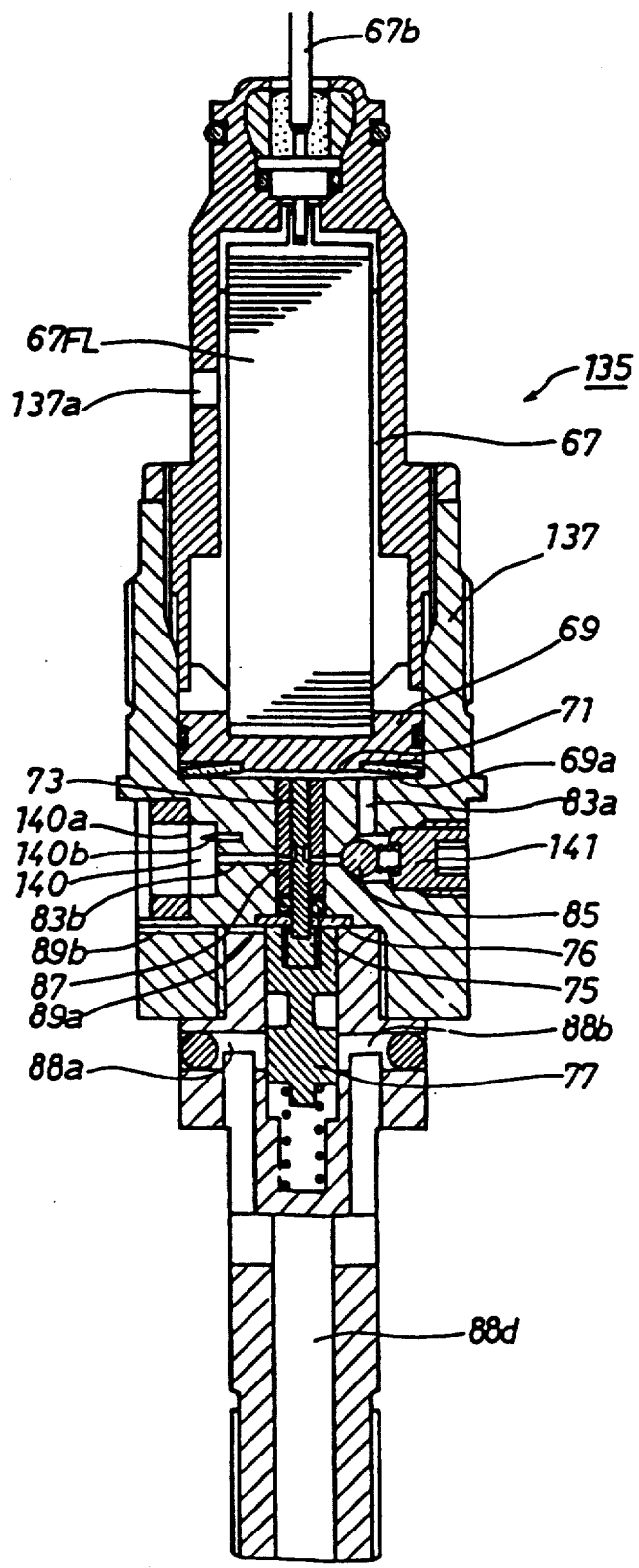
FIG. 11 is a cross-sectional view of a hydraulically operated displacement transmission mechanism according to a third embodiment of the present invention.

FIG. 11 shows a damping force varying valve unit 135 incorporating a hydraulically operated displacement transmission mechanism according to a third embodiment of the present invention.

The damping force varying valve unit 135 has a housing 137 which accommodates therein the piezoelectric stack 67FL, the hydraulic pressure chamber 71, the plunger 73, the spool valve 77, and other components which are the same as those of the first embodiment. In response to a drive signal applied from the terminals 67b, the piezoelectric stack 67FL enables the spool valve 77 to selectively open and close the auxiliary passages 88a, 88b. The damping force varying valve 135 is basically the same as the corresponding valves in the shock absorbers of the first and second embodiments. Those parts of the valve unit 135 which are identical to those of the first and second embodiments are designated by the identical reference numerals, and will not be described in detail.

The damping force varying valve unit 135 differs from the damping force varying valve 95 of the second embodiment in that a piston rod 137 has an oil reservoir 140 defined therein and communicating with the outer open end of the working oil supply passage 83b, the oil reservoir 140 being closed by a rubber diaphragm 140a. The closed oil reservoir 140 is effective to prevent the working oil from leaking out due to vibrations or different postures when the valve unit 135 is assembled into the shock absorber 41 or shipped, or due to expansion of the working oil when the surrounding temperature rises. The rubber diaphragm 140a functions in the same manner as the rubber diaphragm 90a shown in FIG. 6, and can be ruptured by a rupture pin 140b mounted in the piston rod 137 and projecting into the oil reservoir 140. The storage chamber 67 communicates with the exterior through a communication hole 137a.

The damping force varying valve unit 135 can be filled with working oil as follows: After the components of the valve unit 135 have been assembled together, a plug 141 which supports the check valve 85 is loosened out of the piston rod 137. Then, the entire valve unit 135 is immersed in a pool of working oil, and placed in a vacuum container which is then evacuated. The entire hydraulic system in the valve unit 135, including the hydraulic pressure chamber 71, the various passages, and the oil reservoir 140, is thus filled with working oil. Thereafter, the valve unit 135 is removed from the vacuum container, and the plug 141 is tightened in place and sealed.

Figure 12:
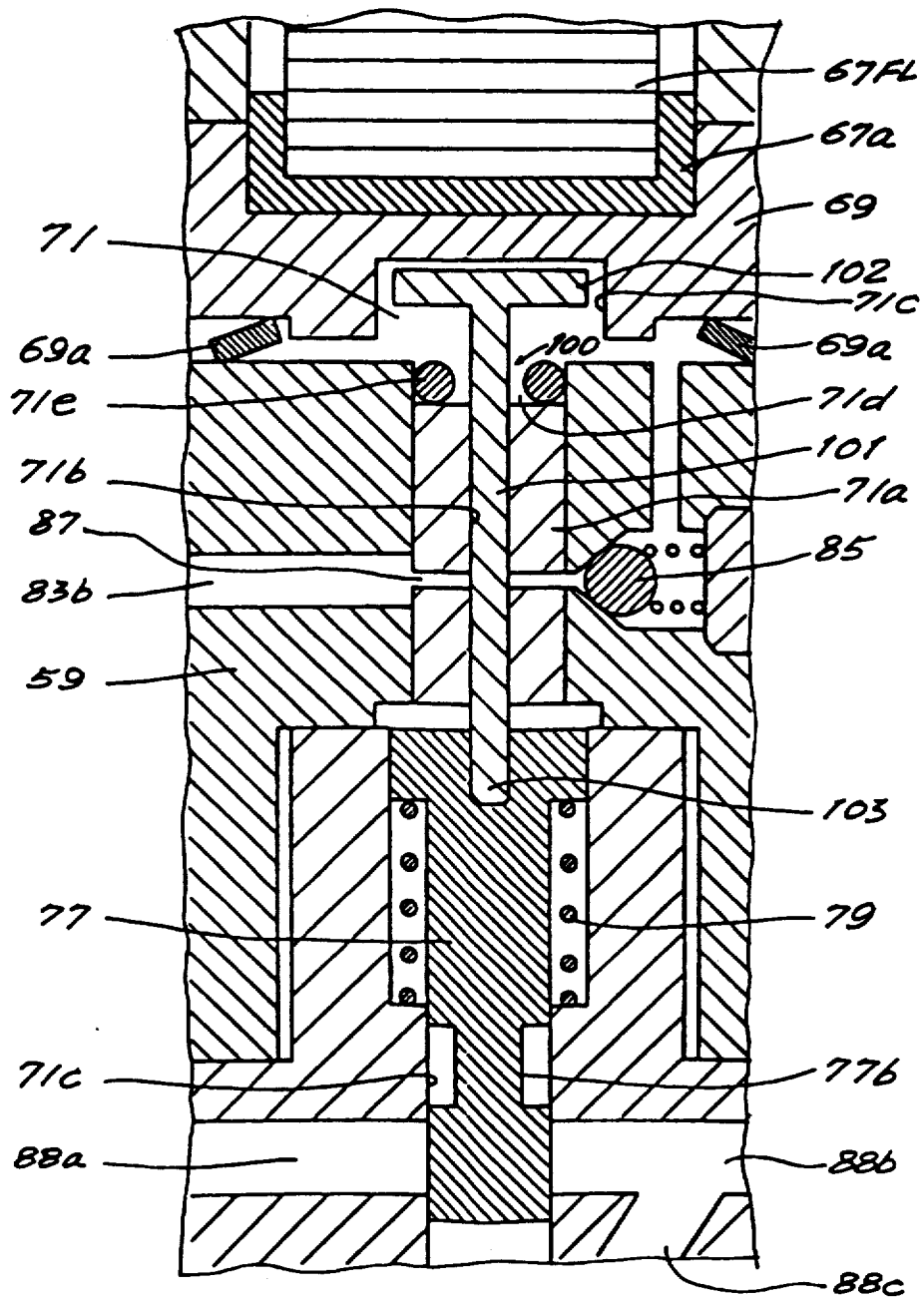
FIG. 12 is an enlarged fragmentary cross-sectional view of a hydraulically operated displacement transmission mechanism according to a fourth embodiment of the present invention.
Figure 13:
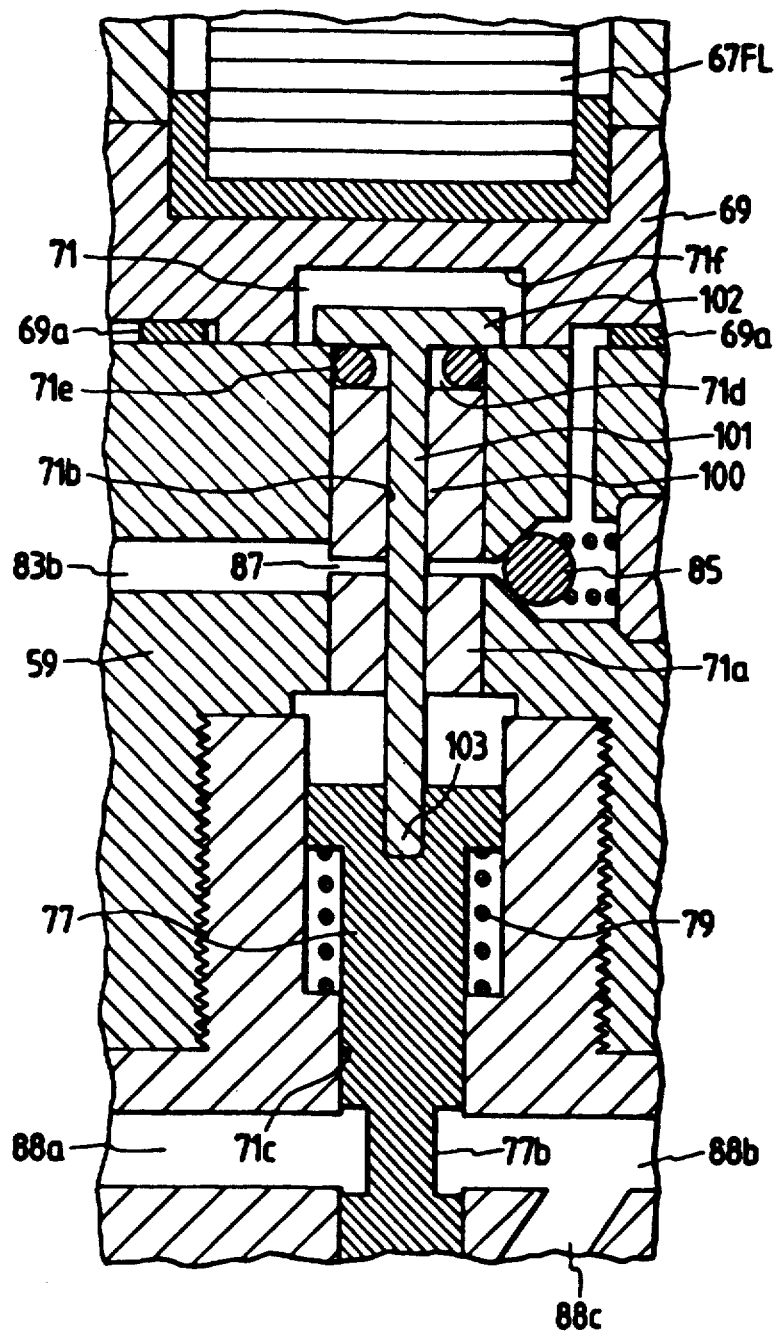
FIG. 13 is a view similar to FIG. 12, showing the manner in which a piezoelectric stack in the displacement transmission mechanism of FIG. 12 is energized.
Figure 14:
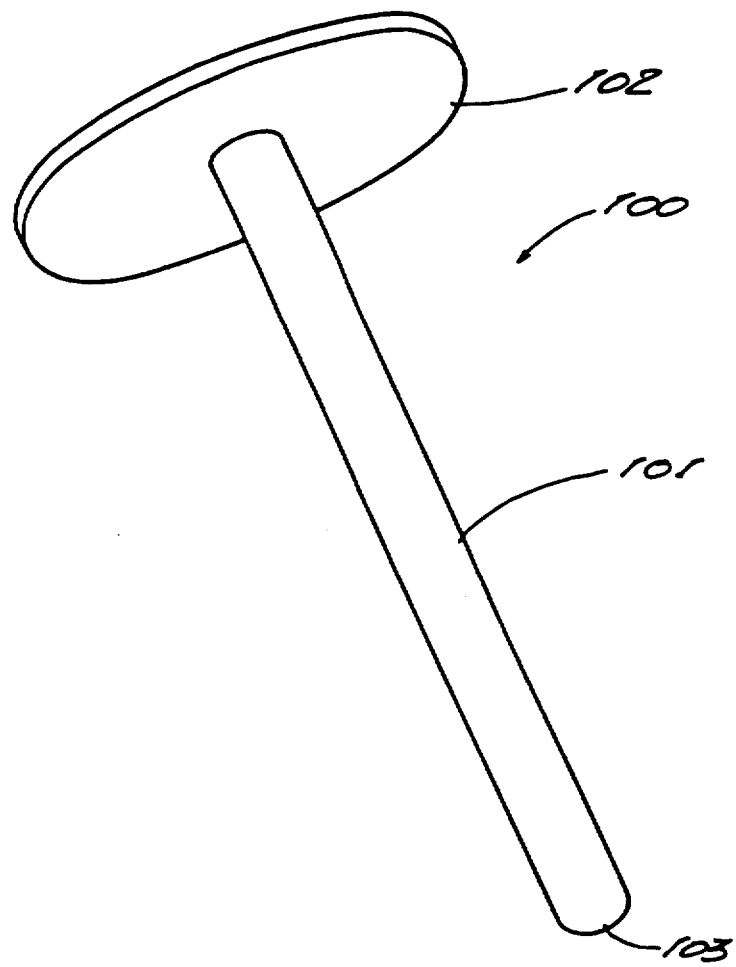
FIG. 14 is a perspective view of a plunger in the displacement transmission mechanism shown in FIG. 12.

FIGS. 12 through 14 show a hydraulically operated displacement transmission mechanism according to a fourth embodiment of the present invention. The displacement transmission mechanism according to the fourth embodiment differs from that of the first embodiment as follows: The hydraulic pressure chamber 71 has an upper recess 71f defined centrally in the piston 69 and a lower recess 71d defined in the piston rod 59 and held in communication with the hole 71b in the sleeve 71a. An O-ring 71e is disposed in the lower recess 71d. A plunger 100 is axially slidably fitted in the hole 71b.

As shown in FIG. 14, the plunger 100 comprises a rod 101 and a disc 102 mounted on one end of the rod 101. As shown in FIG. 12, the disc 102 is placed in the upper recess 71f, and the other end 103 of the rod 101 is securely fitted in the upper end of the spool valve 77 for axial movement therewith.

When a voltage is applied to the piezoelectric stack 67FL, the piston 69 is moved downwardly to increase the hydraulic pressure in the hydraulic pressure chamber 71. The plunger 100 is also moved downwardly under the hydraulic pressure buildup in the hydraulic pressure chamber 71 until the disc 102 is held against the bottom of the hydraulic pressure chamber 71 and the O-ring 71e as shown in FIG. 13. Since the disc 102 and the O-ring 71e are kept in contact with each other around the hole 71b, the working oil in the hydraulic pressure chamber 71 is prevented from leaking through the gap between the plunger rod 101 and the sleeve 71a.

When the voltage applied to the piezoelectric stack 67FL is cut off, the piston 69 returns upwardly under the bias of the spring 69a, and the plunger 100 is also moved back upwardly under the bias of the spring 79 until the disc 102 is positioned in the upper recess 71f as shown in FIG. 12.

Figure 15:
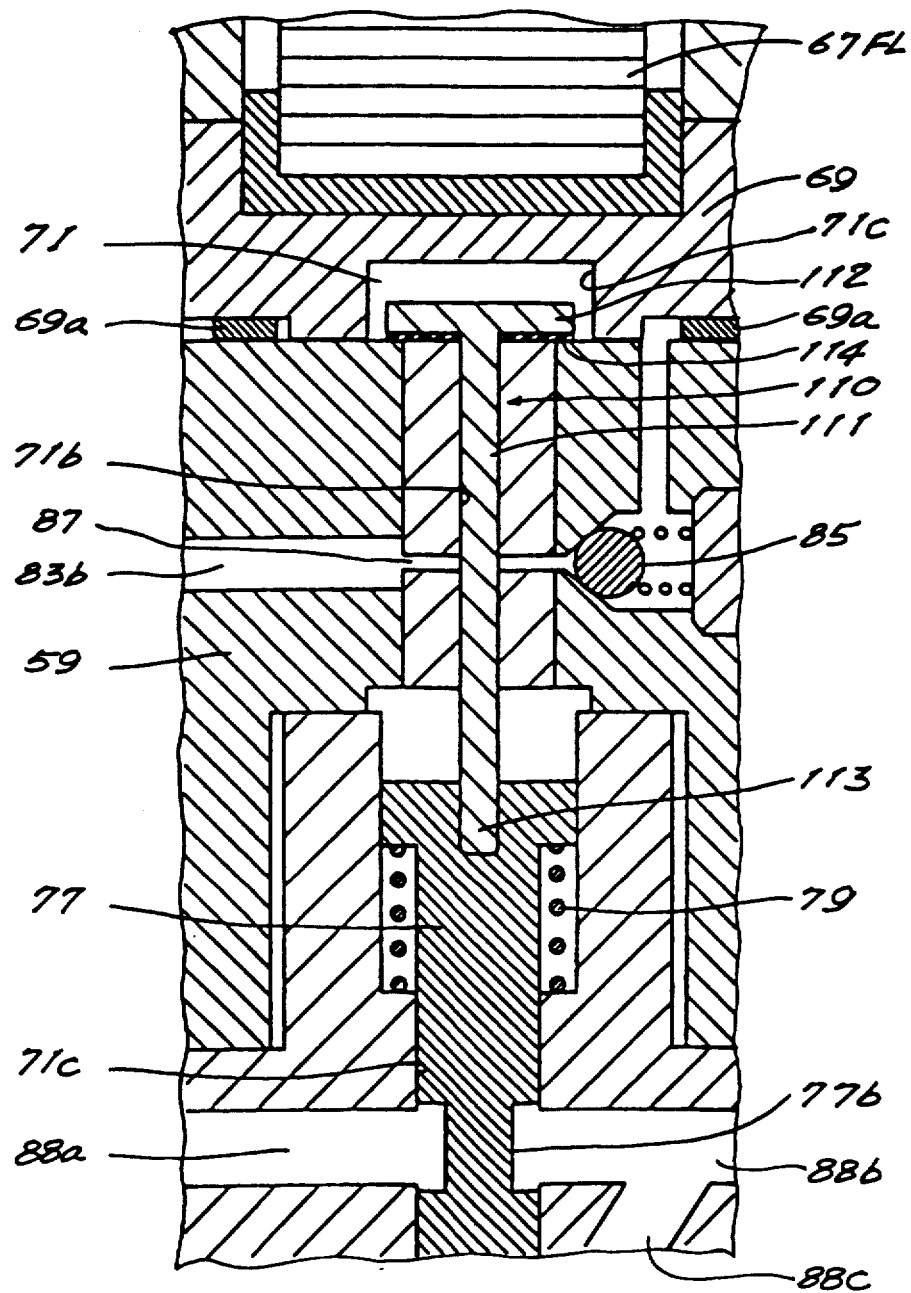
FIG. 15 is an enlarged fragmentary cross-sectional view of a hydraulically operated displacement transmission mechanism according to a fifth embodiment of the present invention.
Figure 16:
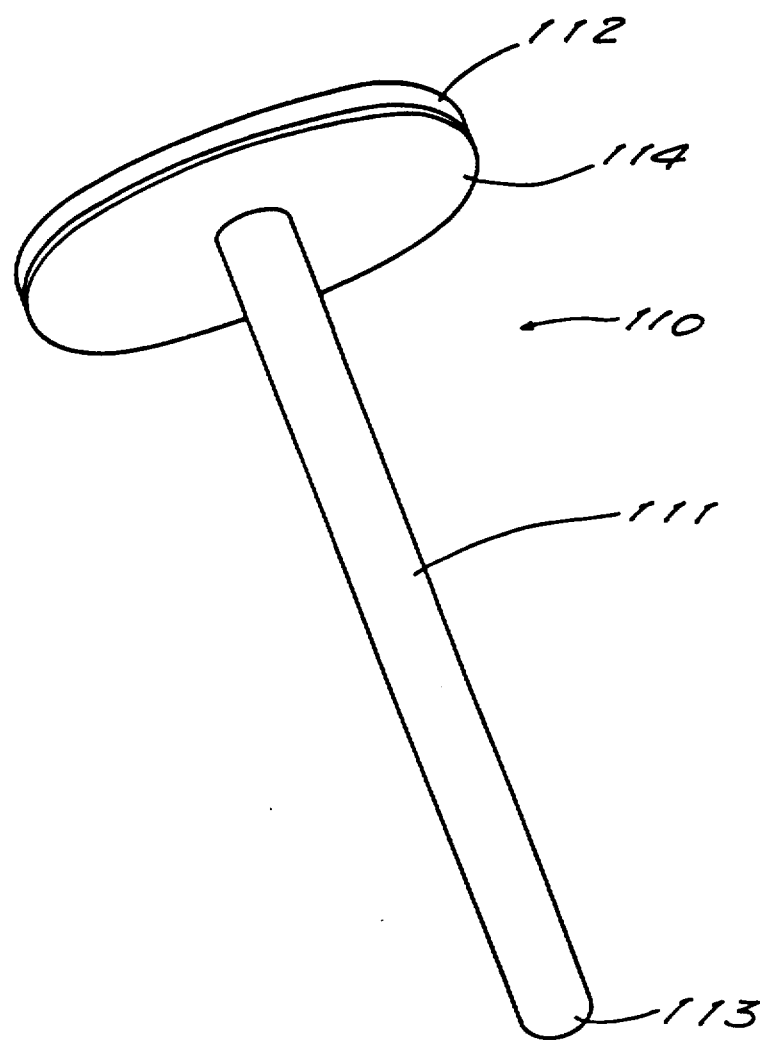
FIG. 16 is a perspective view of a plunger in the displacement transmission mechanism shown in FIG. 15.

FIGS. 15 and 16 illustrate a hydraulically operated displacement transmission mechanism according to a fifth embodiment of the present invention. The displacement transmission mechanism of the fifth embodiment is essentially the same as that which is shown in FIGS. 12 through 14 except that the hydraulic pressure chamber 71 has no lower recess and no O-ring, and a plunger 110 has a somewhat different configuration. More specifically, as shown in FIG. 16, the plunger 110 which is axially slidably fitted in the hole 71b comprises a rod 111 and a disc 112 mounted on one end of the rod 111. As shown in FIG. 15, the disc 112 is placed in the upper recess 71c, and the other end 113 of the rod 111 is securely fitted in the upper end of the spool valve 77 for axial movement therewith. A sealing resilient layer 114 in the form of a rubber diaphragm is attached to the surface of the disc 112 to which the rod 111 is joined, and hence disposed around the joined end of the rod 111.

When a voltage is applied to the piezoelectric stack 67FL, the piston 69 is moved downwardly to develop a hydraulic pressure buildup in the hydraulic pressure chamber 71. The plunger 110 is also moved downwardly under the hydraulic pressure buildup in the hydraulic pressure chamber 71 until the disc 112 is held against the bottom of the hydraulic pressure chamber 71 with the sealing resilient layer 114 pressed therebetween as shown in FIG. 15. Since the sealing resilient layer 114 is firmly pressed between the disc 112 and the bottom of the hydraulic pressure chamber 71 around the hole 71b, the working oil in the hydraulic pressure chamber 71 is prevented from leaking through the gap between the plunger rod 101 and the sleeve 71a.

In each of the above embodiments, the displacement of the piezoelectric stack 67FL is amplified and transmitted to the plunger. However, the principles of the present invention are also applicable to a variable-damping-force shock absorber in which the displacement of a piezoelectric stack, which is not amplified or is reduced in magnitude, is transmitted to the plunger.

Although certain preferred embodiments have been shown and described, it should be understood that many changes and modifications may be made therein without departing from the scope of the appended claims.

What is claimed is:

1. A hydraulically operated displacement transmission mechanism comprising:
   an actuator for producing a displacement;
   a hydraulic pressure chamber filled with a working fluid and having a volume variable in response to the displacement produced by said actuator;
   a sleeve;
   a plunger slidably disposed in said sleeve and reciprocally movable in response to a change in the volume of said hydraulic pressure chamber, whereby the displacement produced by said actuator can be transmitted to said plunger depending on the ratio of pressure-bearing areas of said hydraulic pressure chamber and said plunger, said sleeve and said plunger defining therebetween a gap communicating with said hydraulic pressure chamber for allowing the working fluid to leak from said hydraulic pressure chamber therethrough; and
   a supply passage partly extending through said sleeve for supplying a working fluid from an external working fluid source into said hydraulic pressure chamber, said gap communicating with said supply passage and providing a restriction which is defined around said plunger, whereby the working fluid leaking from said hydraulic pressure chamber through said gap flows into said supply pressure while the working fluid supplied from the external working fluid source into said hydraulic pressure chamber is being restricted by said restriction.

2. A hydraulically operated displacement transmission mechanism according to claim 1, wherein said plunger has an annular groove defined therein, said annular groove being positioned so that it is aligned with said supply passage when said plunger returns to a position in which said volume of the hydraulic pressure chamber is maximum.

3. A hydraulically operated displacement transmission mechanism according to claim 1, further including a check valve disposed in said supply passage and openable only in a direction to allow the working fluid to flow toward said hydraulic pressure chamber.

4. A hydraulically operated displacement transmission mechanism according to claim 1, wherein said actuator and said plunger are relatively sized such that the displacement of said actuator is amplified and transmitted to said plunger.

5. A hydraulically operated displacement transmission mechanism according to claim 1, wherein said plunger comprises a rod axially slidably fitted in said sleeve, a disc joined to one end of said rod and disposed in said hydraulic pressure chamber, and an O-ring disposed between said disc and said sleeve around said gap.

6. A hydraulically operated displacement transmission mechanism according to claim 1, wherein said plunger comprises a rod axially slidably fitted in said sleeve, a disc joined to one end of said rod and disposed in said hydraulic pressure chamber, and a sealing resilient layer attached to said disc and disposed around said one end of the rod.

7. A hydraulically operated displacement transmission mechanism comprising:
   an actuator for producing a displacement;
   a hydraulic pressure chamber filled with a working fluid and having a volume variable in response to the displacement produced by said actuator;
   a sleeve;
   a plunger slidably disposed in said sleeve and reciprocally movable in response to a change in the volume of said hydraulic pressure chamber, whereby the displacement produced by said actuator can be transmitted to said plunger depending on the ratio of pressure-bearing areas of said hydraulic pressure chamber and said plunger, said sleeve and said plunger defining therebetween a gap communicating with said hydraulic pressure chamber for allowing the working fluid to leak from said hydraulic pressure chamber therethrough;
   a supply passage partly extending through said sleeve for supplying a working fluid from an external working fluid source into said hydraulic pressure chamber, said gap communicating with said supply passage and providing a restriction which is defined around said plunger, whereby the working fluid leaking from said hydraulic pressure chamber through said gap flows into said supply pressure while the working fluid supplied from the external working fluid source into said hydraulic pressure chamber is being restricted by said restriction;
   a shock absorber; and
   valve means coupled to said plunger for varying damping forces of said shock absorber.

8. A displacement transmission mechanism comprising:
   an actuator for producing a displacement;
   a piston slidable in response to the displacement produced by said actuator;
   a fluid pressure chamber filled with a working fluid and having a side wall defined by a first side of said piston, said fluid pressure chamber having a volume variable in response to sliding movement of said piston;
   a sleeve;
   a plunger having a first end exposed to said fluid pressure chamber, said plunger being slidable in response to a change in the volume of said fluid pressure chamber, whereby the displacement produced by said actuator can be transmitted to said plunger depending on the pressure-bearing areas of said hydraulic pressure chamber and said plunger, said sleeve and said plunger defining therebetween a gap communicating with said hydraulic pressure chamber for allowing the working fluid to leak from said hydraulic pressure chamber therethrough;
   a first supply passage partly extending through said sleeve for supplying a working fluid from an external working fluid source into said hydraulic pressure chamber, said gap communicating with said supply passage and providing a restriction which is defined around said plunger, whereby the working fluid leaking from said hydraulic pressure chamber through said gap flows into said supply passage while the working fluid supplied from the external working fluid source into said hydraulic pressure chamber is being restricted by said restriction;
   a second supply passage for supplying the working fluid from said external working fluid source into a chamber to which a second side of said piston opposite to said first side thereof is exposed, in order to apply the working fluid under the same pressure to said first and second sides of the piston in a direction in which the piston is slidable; and a third supply passage for supplying the working fluid from said external working fluid source into a chamber to which an opposite second end of said plunger is exposed, in order to apply the working fluid under the same pressure to said first and second ends of the plunger in a direction in which the plunger is slidable.

9. A displacement transmission mechanism according to claim 8, further including a check valve disposed in said first supply passage and openable only in a direction to allow the working fluid to flow from said external working fluid source toward said fluid pressure chamber.

10. A displacement transmission mechanism according to claim 8, wherein said first side of said piston has an area greater than the area of said first end of said plunger such that the displacement of said actuator is amplified and transmitted to said plunger.

11. A displacement transmission mechanism comprising:

an actuator for producing a displacement;

a piston slidable in response to the displacement produced by said actuator;

a fluid pressure chamber filled with a working fluid and having a side wall defined by a first side of said piston, said fluid pressure chamber having a volume variable in response to sliding movement of said piston;

a sleeve;

a plunger having a first end exposed to said fluid pressure chamber, said plunger being slidable in response to a change in the volume of said fluid pressure chamber, whereby the displacement produced by said actuator can be transmitted to said plunger depending on the pressure-bearing areas of said hydraulic pressure chamber and said plunger, said sleeve and said plunger defining therebetween a gap communicating with said hydraulic pressure chamber for allowing the working fluid to leak from said hydraulic pressure chamber therethrough;

a first supply passage partly extending through said sleeve for supplying a working fluid from an external working fluid source into said hydraulic pressure chamber, said gap communicating with said supply passage and providing a restriction which is defined around said plunger, whereby the working fluid leaking from said hydraulic pressure chamber through said gap flows into said supply passage while the working fluid supplied from the external working fluid source into said hydraulic pressure chamber is being restricted by said restriction;

a second supply passage for supplying the working fluid from said external working fluid source into a chamber to which a second side of said piston opposite to said first side thereof is exposed, in order to apply the working fluid under the same pressure to said first and second sides of the piston in a direction in which the piston is slidable;

a third supply passage for supplying the working fluid from said external working fluid source into a chamber to which an opposite second end of said plunger is exposed, in order to apply the working fluid under the same pressure to said first and second ends of the plunger in a direction in which the plunger is slidable; and a shock absorber having a pair of fluid pressure chambers defined therein, said external working fluid source comprising one of the fluid pressure chambers of the shock absorber.

12. A displacement transmission mechanism comprising:

an actuator for producing a displacement;

a piston slidable in response to the displacement produced by said actuator;

a fluid pressure chamber filled with a working fluid and having a side wall defined by a first side of said piston, said fluid pressure chamber having a volume variable in response to sliding movement of said piston;

a plunger having a first end exposed to said fluid pressure chamber, said plunger being slidable in response to a change in the volume of said fluid pressure chamber;

a first supply passage for supplying the working fluid from an external working fluid source into said fluid pressure chamber;

a second supply passage for supplying the working fluid from said external working fluid source into a chamber to which a second side of said piston opposite to said first side thereof is exposed, in order to apply the working fluid under the same pressure to said first and second sides of the piston in a direction in which the piston is slidable; and a third supply passage for supplying the working fluid from said external working fluid source into a chamber to which an opposite second end of said plunger is exposed, in order to apply the working fluid under the same pressure to said first and second ends of the plunger in a direction in which the plunger is slidable, wherein said first fluid supply passage supplies to the working fluid to said fluid pressure chamber through a clearance defined around said plunger.

13. A displacement transmission mechanism according to claim 12, wherein said plunger has an annular groove defined therein, said annular groove being positioned so that it is aligned with said first supply passage when said plunger returns to a position in which said volume of the hydraulic pressure chamber is maximum.

* * * * *